US008950182B2

(12) United States Patent
Roth

(10) Patent No.: US 8,950,182 B2
(45) Date of Patent: Feb. 10, 2015

(54) KNOCK-RESPONSIVE ADJUSTMENT OF AN EXTERNAL EGR MIXTURE

(75) Inventor: David B. Roth, Groton, NY (US)

(73) Assignee: BorgWarner Inc., Auburn Hills, MI (US)

(*) Notice: Subject to any disclaimer, the term of this patent is extended or adjusted under 35 U.S.C. 154(b) by 651 days.

(21) Appl. No.: 13/256,030

(22) PCT Filed: Mar. 10, 2010

(86) PCT No.: PCT/US2010/026740
§ 371 (c)(1),
(2), (4) Date: Nov. 28, 2011

(87) PCT Pub. No.: WO2010/107636
PCT Pub. Date: Sep. 23, 2010

(65) Prior Publication Data
US 2012/0060497 A1 Mar. 15, 2012

Related U.S. Application Data

(60) Provisional application No. 61/161,227, filed on Mar. 18, 2009.

(51) Int. Cl.
F02B 33/44 (2006.01)
F02M 25/07 (2006.01)
(Continued)

(52) U.S. Cl.
CPC ......... *F02M 25/0707* (2013.01); *F02D 35/027* (2013.01); *F02D 41/0007* (2013.01); *F02D 41/005* (2013.01); *F02D 41/0065* (2013.01);
(Continued)

(58) Field of Classification Search
CPC .......... F02M 25/0707; F02M 25/0709; F02M 25/0728; F02M 25/0738; F02M 25/0713; F02M 25/0718; F02M 25/0753; F02M 25/0754; F02D 35/027; F02D 41/0007; F02D 41/005; F02D 41/0065; F02D 37/02; F02D 9/04; F02D 41/187; F02D 2041/0075; F02D 2200/0402; F02B 29/0406; Y02T 10/144; Y02T 10/47
USPC ........ 60/605.2; 701/108; 123/406.23, 406.29, 123/406.32, 406.34, 406.35, 568.12
IPC ............. F02M 25/07; F02D 23/00; F02B 37/00
See application file for complete search history.

(56) References Cited

U.S. PATENT DOCUMENTS 4,426,848 A * 1/1984 Stachowicz .................. 60/605.2
6,041,756 A 3/2000 Bonne
(Continued)

FOREIGN PATENT DOCUMENTS

CN 1624305 A 6/2005
EP 0849453 A2 6/1998
(Continued)

OTHER PUBLICATIONS

Japanese Office Action dated Nov. 1, 2013; Application No. 2012-500835; Applicant: BorgWarner Inc.; 4 pages.
(Continued)

Primary Examiner — Thai Ba Trieu
(74) Attorney, Agent, or Firm — BrooksGroup

(57) ABSTRACT

A method of adjusting an external exhaust gas recirculation mixture in response to engine knock of a spark-ignition turbocharged engine, and related products.

17 Claims, 2 Drawing Sheets

(51) Int. Cl.

| | | |
|---|---|---|
| *F02D 35/02* | (2006.01) | |
| *F02D 41/00* | (2006.01) | |
| *F02B 29/04* | (2006.01) | |
| *F02D 9/04* | (2006.01) | |
| *F02D 41/18* | (2006.01) | |

(52) U.S. Cl.
CPC ....... *F02M 25/0709* (2013.01); *F02M 25/0728* (2013.01); *F02M 25/0738* (2013.01); *F02B 29/0406* (2013.01); *F02D 9/04* (2013.01); *F02D 41/187* (2013.01); *F02D 2041/0075* (2013.01); *F02D 2200/0402* (2013.01); *F02M 25/0713* (2013.01); *F02M 25/0718* (2013.01); *F02M 25/0754* (2013.01); *Y02T 10/144* (2013.01); *Y02T 10/47* (2013.01)
USPC ............... 60/605.2; 701/108; 123/568.12

(56) References Cited

U.S. PATENT DOCUMENTS

| | | | |
|---|---|---|---|
| 6,748,936 B2 | 6/2004 | Kinomura et al. | |
| 6,899,090 B2 | 5/2005 | Arnold | |
| 7,165,403 B2 | 1/2007 | Sun et al. | |
| 7,165,540 B2 | 1/2007 | Brookshire et al. | |
| 7,195,006 B2 | 3/2007 | Khair et al. | |
| 8,100,115 B2 * | 1/2012 | Koch | 123/568.12 |
| 8,103,428 B2 * | 1/2012 | Russ et al. | 701/108 |
| 8,196,404 B2 * | 6/2012 | Onishi et al. | 701/108 |
| 8,352,163 B2 * | 1/2013 | Russ et al. | 701/108 |
| 2003/0209234 A1 | 11/2003 | Kinomura et al. | |
| 2004/0187847 A1 * | 9/2004 | Viele et al. | 701/108 |
| 2006/0070381 A1 | 4/2006 | Parlow et al. | |
| 2007/0144501 A1 | 6/2007 | Joergl et al. | |
| 2011/0010079 A1 * | 1/2011 | Shutty et al. | 701/108 |
| 2011/0191010 A1 * | 8/2011 | Russ et al. | 701/108 |
| 2012/0116648 A1 * | 5/2012 | Russ et al. | 701/102 |

FOREIGN PATENT DOCUMENTS

| | | | | |
|---|---|---|---|---|
| JP | 04103867 A | * | 4/1992 | ............ F02M 25/07 |
| JP | 2003328839 A | | 11/2003 | |
| JP | 2004150319 A | * | 5/2004 | ............ F02M 25/07 |
| JP | 2005315256 A | | 11/2005 | |
| JP | 2006118362 A | | 5/2006 | |
| JP | 2008050946 A | * | 3/2008 | ............ F02M 25/07 |
| JP | 2008106706 A | * | 5/2008 | ............ F02M 25/07 |
| JP | 2008115780 A | * | 5/2008 | ............ F02M 25/07 |
| JP | 2008138598 A | * | 6/2008 | ............ F02M 25/07 |
| JP | 4175449 B2 | | 11/2008 | |
| WO | 2007076038 A2 | | 7/2007 | |

OTHER PUBLICATIONS

Chinese Office Action dated Aug. 5, 2013; Applicant: BorgWarner Inc.; Application No. 201080010887.2; 13 pages.
Chinese Office Action dated Mar. 21, 2014; Applicant: Borg Warner Inc.; Application No. 201080010887.2; 8 pages.

* cited by examiner

KNOCK-RESPONSIVE ADJUSTMENT OF AN EXTERNAL EGR MIXTURE

This application claims the benefit of U.S. Provisional Application Ser. No. 61/161,227 filed Mar. 18, 2009.

TECHNICAL FIELD

The field to which the disclosure generally relates includes controlling exhaust gas recirculation within turbocharged spark ignition engine systems.

BACKGROUND

Turbocharged engine systems include engines having combustion chambers for combusting fuel and oxidants for conversion into mechanical power, and also having induction subsystems to convey induction gases to the combustion chambers. Such engine systems also have exhaust subsystems to carry exhaust gases away from the combustion chambers, muffle engine exhaust noise, and reduce exhaust gas particulates and oxides of nitrogen (NOx), which tend to increase as engine combustion temperatures increase. Exhaust gas is often recirculated out of the exhaust gas subsystem, into the induction subsystem for mixture with fresh air, and back to the engine. Exhaust gas recirculation increases the amount of inert gas and concomitantly reduces the amount of oxygen in the induction gases, thereby reducing engine combustion temperatures and, thus, reducing NOx formation.

Engine knock may include sound and other effects associated with non-uniform combustion of an oxidant/fuel mixture. For example, in a spark-ignition engine, a spark plug ignites a first portion of an oxidant/fuel mixture, thereby creating a flame front that combusts the first portion and travels away from the spark plug toward unburned portions of the mixture. Hot combustion gases behind the flame front rapidly compress the unburned portions of the mixture ahead of the flame front, thereby quickly raising the temperature of the unburned portions above a self-ignition temperature of the mixture. If the flame front travels fast enough to consume the unburned portions before the unburned portions self-ignite, then normal combustion without knock takes place. Otherwise, the unburned portions nearly instantly combust, thereby producing a strong shock wave in the combustion chamber that causes the characteristic metallic pinging or knocking sound.

SUMMARY OF EXEMPLARY EMBODIMENTS

One exemplary embodiment includes a method of external exhaust gas recirculation (EGR) including monitoring for engine knock in a spark-ignition turbocharged engine, and controlling flow of uncooled high pressure EGR and cooled low pressure EGR to the engine. The flow control includes adjustment of uncooled high pressure EGR relative to cooled low pressure EGR such that uncooled high pressure EGR is increased relative to cooled low pressure EGR in response to absence of engine knock, and, in response to presence of engine knock, uncooled high pressure EGR is decreased relative to cooled low pressure EGR until engine knock ceases.

Another exemplary embodiment includes a method of external exhaust gas recirculation (EGR) in a spark-ignition turbocharged engine, including sensing speed of the engine, determining load of the engine, and monitoring for engine knock in the engine. The method also includes controlling flow of uncooled high pressure EGR and cooled low pressure EGR to the engine according to an exhaust gas recirculation model that is based on engine speed and load and that includes an uncooled high pressure EGR and cooled low pressure EGR mixture region. The flow control includes adjustment of uncooled high pressure EGR relative to cooled low pressure EGR when the engine operates at speeds and loads corresponding to the EGR mixture region such that uncooled high pressure EGR is increased relative to cooled low pressure EGR in response to absence of engine knock, and, in response to presence of engine knock, uncooled high pressure EGR is decreased relative to cooled low pressure EGR until engine knock ceases.

Another exemplary embodiment includes a product for a turbocharged spark-ignition engine. The product includes a turbocharger including a turbine, an uncooled high pressure EGR path upstream of the turbocharger turbine, a cooled low pressure EGR path downstream of the turbocharger turbine, and at least one EGR flow control device in communication with at least one of the EGR paths. The product also includes a controller in communication with the at least one EGR flow control device to control flow of uncooled high pressure EGR to the engine and cooled low pressure EGR to the engine. The controller controls the at least one EGR flow control device to adjust uncooled high pressure EGR relative to cooled low pressure EGR such that uncooled high pressure EGR is increased relative to cooled low pressure EGR in absence of engine knock, and, in presence of engine knock, uncooled high pressure EGR is decreased relative to cooled low pressure EGR until engine knock ceases.

Other exemplary embodiments will become apparent from the detailed description provided hereinafter. It should be understood that the detailed description and specific examples, while disclosing exemplary embodiments, are intended for purposes of illustration only and are not intended to limit the scope of the claims.

BRIEF DESCRIPTION OF THE DRAWINGS

Exemplary embodiments will become more fully understood from the detailed description and the accompanying drawings, wherein.

DETAILED DESCRIPTION OF EXEMPLARY EMBODIMENTS

The following description of the exemplary embodiments is merely exemplary in nature and is in no way intended to limit the claims, their application, or uses.

Figure 1:
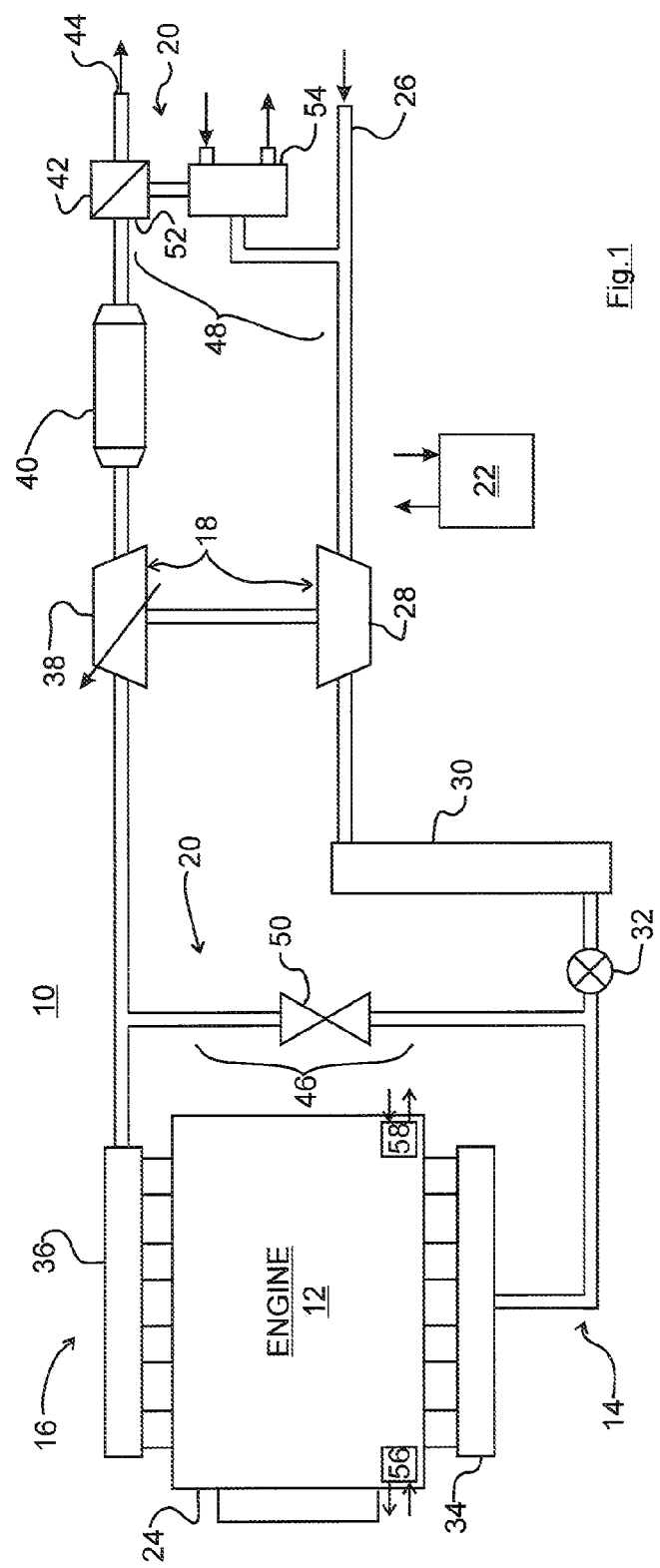
FIG. 1 is a schematic view of an exemplary embodiment of a turbocharged spark-ignition engine system including an uncooled high pressure exhaust gas recirculation (EGR) path and a cooled low pressure EGR path.

An exemplary operating environment is illustrated in FIG. 1, and may be used to implement a method of exhaust gas recirculation (EGR) control including knock-responsive adjustment of an external EGR mixture. The method may be carried out using any suitable system and, preferably, is carried out in conjunction with an engine system such as system 10. The following system description simply provides a brief overview of one exemplary engine system, but other systems and components not shown here could also support the method.

In general, the system 10 may include an internal combustion engine 12 to develop mechanical power from internal combustion of a mixture of fuel and induction gases. Suitable fuel for use by the engine may include but is not limited to, gasoline and diesel fuel. The system also may include an induction subsystem 14 to generally provide the induction gases to the engine 12, and an exhaust subsystem 16 to convey combustion gases away from the engine 12. As used herein, the phrase induction gases may include fresh air and recirculated exhaust gases and/or any other suitable oxidant. The system 10 also may include a turbocharger 18 in communication across the exhaust and induction subsystems 14, 16 to compress inlet air and/or recirculated exhaust gases to improve combustion and thereby increase engine output. The system 10 further may include an external exhaust gas recirculation (EGR) subsystem 20 across the exhaust and induction subsystems 14, 16 to recirculate exhaust gases for mixture with fresh air to improve emissions performance of the engine system 10. The system 10 further may include a control subsystem 22 to control operation of the engine system 10. Those skilled in the art will recognize that a fuel subsystem (not shown) may be used to provide any suitable liquid and/or gaseous fuel to the engine 12 for combustion therein with the induction gases.

The engine 12 may include a spark-ignition type of engine constructed and arranged to combust gasoline or other combustible fuels. The engine 12 may include a block 24 with cylinders and pistons therein (not separately shown), which along with a cylinder head (also not separately shown) define combustion chambers (not shown) for internal combustion of a mixture of fuel and induction gases. The engine 12 may include any quantity of cylinders, and may be of any size and may operate according to any suitable speeds and loads. Exemplary idle speeds may be on the order of about 500 to about 800 RPM, and typical maximum engine speed may be on the order of about 5500-6500 RPM but may even exceed that range. As used herein, the term low speeds and loads may include about 0% to 33% of maximum engine speeds and loads, intermediate speeds and loads may include about 25% to 75% of maximum engine speeds and loads, and high speeds and loads may include about 66% to 100% of maximum engine speeds and loads. As used herein, low to intermediate speeds and loads may include about 0% to 50% of maximum engine speeds and loads, and intermediate to high speeds and loads may include about 50% to 100% of maximum engine speeds and loads.

The induction subsystem 14 may include, in addition to suitable conduit and connectors, an inlet end 26 which may have an air filter (not shown) to filter incoming air, and a turbocharger compressor 28 downstream of the inlet end 26 to compress the inlet air. The induction subsystem 14 may also include a charge air cooler 30 downstream of the turbocharger compressor 28 to cool the compressed air, and an intake throttle valve 32 downstream of the charge air cooler 30 to throttle the flow of the cooled air to the engine 12. In another embodiment, the induction subsystem 14 may not include the throttle valve 32 and, instead, load control may be carried out using a variable valve lift and duration valvetrain (not shown) of the engine 12. The induction subsystem 14 also may include an intake manifold 34 downstream of the throttle valve 32 and upstream of the engine 12, to receive the throttled air and distribute it to the engine combustion chambers.

The exhaust subsystem 16 may include, in addition to suitable conduit and connectors, an exhaust manifold 36 to collect exhaust gases from the combustion chambers of the engine 12 and convey them downstream to the rest of the exhaust subsystem 16. The exhaust subsystem 16 also may include a turbocharger turbine 38 in downstream communication with the exhaust manifold 36. The turbocharger 18 may be a variable turbine geometry (VTG) type of turbocharger, a dual stage turbocharger, or a turbocharger with a wastegate or bypass device, or the like. In any case, the turbocharger 18 and/or any turbocharger accessory device(s) may include a suitable actuator and may be adjusted to affect one or more exhaust gas recirculation flows. The exhaust subsystem 16 may also include any suitable emissions device(s) 40 in any suitable location, for example, a catalytic converter, or the like. The exhaust subsystem 16 may also include an exhaust throttle valve 42 disposed upstream of an exhaust outlet 44.

The EGR subsystem 20 is preferably a hybrid or dual path external EGR subsystem to recirculate portions of the exhaust gases from the exhaust subsystem 16 to the induction subsystem 14 for combustion in the engine 12. Accordingly, the EGR subsystem 20 may include two paths: a high pressure (HP) EGR path 46 and a low pressure (LP) EGR path 48. Preferably, the HP EGR path 46 may be connected to the exhaust subsystem 16 upstream of the turbocharger turbine 38 but connected to the induction subsystem 12 downstream of the turbocharger compressor 28. Also preferably, the LP EGR path 48 may be connected to the exhaust subsystem 16 downstream of the turbocharger turbine 38 but connected to the induction subsystem 14 upstream of the turbocharger compressor 28.

The HP EGR path 46 may include, in addition to suitable conduit and connectors, an HP EGR flow control device 50 to control recirculation of exhaust gases from the exhaust subsystem 16 to the induction subsystem 14. The device 50 may be an HP EGR valve 50, which may be located in the path 46 between the exhaust and induction conduit, or at a joint of the path 46 and the exhaust or induction conduit and may be operable upstream of the turbocharger turbine 38. The HP EGR valve 50 may be a stand-alone device having its own actuator or may be integrated with the intake throttle valve 32 into a combined device having a common actuator. The HP EGR path 46 may be connected upstream of the turbocharger turbine 38 and downstream of the throttle valve 32 to mix HP EGR gases with throttled air and other induction gases (the air may have LP EGR). In any case, the HP EGR path 46 may provide uncooled HP EGR for delivery to the engine 12. Although not shown, the HP EGR path 46 may also include a cooler with a bypass valve and branch around the cooler to provide cooled and/or uncooled HP EGR.

The LP EGR path 48 may include, in addition to suitable conduit and connectors, an LP EGR flow control device 52 to control recirculation of exhaust gases from the exhaust subsystem 16 to the induction subsystem 14. The device 52 may be an LP EGR valve 52, which may be located in the path 48 between the exhaust and induction conduit, or at the joint of the path 48 and the exhaust conduit as shown. The LP EGR valve 52 may be a stand-alone device having its own actuator or may be integrated with the exhaust throttle valve 42 into a combined device having a common actuator as depicted in FIG. 1. The LP EGR path 48 may also include an LP EGR cooler 54 downstream, or optionally upstream, of the LP EGR valve 52 to cool the LP EGR gases. The LP EGR path 48 may be connected downstream of the turbocharger turbine 38 and upstream of the turbocharger compressor 28 to mix LP EGR gases with filtered inlet air. In any case, the LP EGR path 48 may provide cooled LP EGR for delivery to the engine 12. Although not shown, the LP EGR path 48 may also include a bypass valve and branch around the cooler 54 to provide cooled and/or uncooled LP EGR.

The control subsystem 22 may include any suitable hardware, software, and/or firmware to carry out at least some portions of the methods disclosed herein. For example, the control subsystem 22 may include output devices, for example, some or all of the engine system actuators discussed above. In another example, the control subsystem 22 may also include input devices, for example, any number and any type(s) of engine system sensors 56, 58.

The engine system sensors 56, 58 may include any suitable devices to monitor engine system parameters. In some examples, a knock sensor may measure engine knocking, an engine speed sensor may measure the rotational speed of an engine crankshaft, camshaft, or the like (not shown), and intake and exhaust manifold pressure sensors may measure pressure of gases flowing into and away from the engine cylinders. In further examples, an inlet air mass flow sensor may measure incoming airflow in the induction subsystem 14, a manifold mass flow sensor may measure flow of induction gases to the engine 12, and exhaust system flow sensors may measure flow through either or both of the EGR paths 46, 48 or any other exhaust system portion(s).

In addition to the types of sensors discussed herein, any other suitable sensors and their associated parameters may be encompassed by the system and methods. For example, the sensors 56, 58 may also or instead include engine cylinder pressure sensors, other pressure sensors, temperature sensors, other speed sensors, position sensors, pressure sensors, chemical sensors, acceleration sensors, filter sensors, other flow sensors, vibration sensors, or the like. In other words, any sensors may be used to sense any suitable physical parameters including electrical, mechanical, and chemical parameters. As used herein, the term sensor may include any suitable hardware and/or software used to sense any engine system parameter and/or various combinations of such parameters.

The control subsystem 22 may further include one or more controllers (not shown) in communication with the actuators and sensors 56, 58 for receiving and processing sensor input and transmitting actuator output signals. In general, the controller may receive and process input the various sensors 56, 58 in light of stored instructions and/or data, and transmit output signals to various system devices, for example, actuators of valves 32, 42, 50, 52 and the turbine 38. Although not shown, the controller and other powered system devices may be supplied with electricity by a power supply, for example, one or more batteries, fuel cells, or the like. The controller may include, for example, an electrical circuit, an electronic circuit or chip, and/or a computing device.

In the computing device embodiment, the controller generally may include a processor, memory that may be coupled to the processor, and one or more interfaces coupling the controller to the one or more other system devices. The processor may execute instructions that provide at least some of the functionality for the engine system 10. As used herein, the term instructions may include, for example, control logic, computer software and/or firmware, programmable instructions, or other suitable instructions. The processor may include, for example, one or more microprocessors, microcontrollers, application specific integrated circuits, and/or any other suitable type of processing device. Also, the memory may be configured to provide storage for data received by or loaded to the engine system 10, and/or for processor-executable instructions. The data and/or instructions may be stored, for example, as look-up tables, formulas, algorithms, maps, models, and/or any other suitable format. The memory may include, for example, RAM, ROM, EPROM, and/or any other suitable type of storage device.

Finally, the interfaces may include, for example, analog/digital or digital/analog converters, signal conditioners, amplifiers, filters, other electronic devices or software modules, and/or any other suitable interfaces. The interfaces may conform to, for example, RS-232, parallel, small computer system interface, universal serial bus, CAN, MOST, LIN, FlexRay, and/or any other suitable protocol(s). The interfaces may include circuits, software, firmware, or any other device to assist or enable the controller in communicating with the other system devices.

The method may be at least partially performed as a computer program and the various engine system data may be stored in memory as a look-up table or the like. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable medium, which include one or more storage devices and/or signals, in compressed or uncompressed form. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the method may be at least partially performed by any electronic device(s) capable of executing the functions disclosed herein.

The control subsystem 22 may receive and process input signals from one or more of the engine system parameter sensors 56, 58 to directly measure and calculate a total EGR fraction in any suitable manner, or to estimate the total EGR fraction, for example, as disclosed in WO07076038. Also, the individual amounts of HP and LP EGR that constitute the total EGR fraction may be generally controlled as also disclosed in WO07076038, for example, as a ratio of HP to LP EGR, a percentage of HP EGR relative to LP EGR, or the like. But the amount of HP EGR may be more specifically controlled in accordance with the method described below.

One embodiment may include a method of controlling external exhaust gas recirculation that may be at least partially carried out as one or more computer programs within the operating environment of the system 10 described above. Those skilled in the art will also recognize that the method according to any number of embodiments may be carried out using other engine systems within other operating environments. As the description of the method progresses, reference will be made to the exemplary system 10 of FIG. 1.

According to an exemplary implementation of the method, speed of a spark-ignition turbocharged engine is sensed. For example, one of the sensors 56, 58 may be a crankshaft sensor in communication with the controller of the control subsystem 22.

Also, load of the engine is determined. For example, engine load may be determined using one or more of the sensors 56, 58 to sense any suitable parameter(s) for example, pressure(s), correlated to engine load, or the like.

In one embodiment, engine load may be controlled by the throttle valve 32. In another embodiment, engine load may be controlled by a variable valve lift and duration valvetrain (not shown) of the engine 12. Controlling uncooled HPL may be applicable in a non-throttled engine at speeds above that for which there is at least some pressure drop or differential to drive flow of uncooled HPL. In one example, such speeds may be on the order of about 2,500 RPM. Accordingly, the method may be used with throttled and non-throttled engines.

Further, the engine is monitored for engine knock. For example, one or more of the sensors 56, 58 may include one or more engine knock sensors in communication with the controller of the control subsystem 22. In another example, engine knock may be determined based on one or more other sensed parameters, which may be sensed using the sensors 56, 58.

Moreover, flow of uncooled HP EGR and cooled LP EGR to the engine may be controlled according to an EGR model including uncooled high pressure EGR and cooled low pressure EGR portions. For example, flow of exhaust gases through the uncooled HP and cooled LP EGR paths may be adjusted in response to engine knock sensed by one or more of the sensors 56, 68. More specifically, the control subsystem 22 may monitor one or more engine knock sensors, process such input, and produce output signals to one or more of the above-discussed actuators to control one or more of the valves 32, 42, 50, 52 and/or turbocharger turbine 38 to vary the flow through the EGR paths 46, 48 to provide an external EGR mixture of uncooled HP and cooled LP EGR that avoids engine knock. Those of ordinary skill in the art will recognize that presence and absence of engine knock may be determined directly by using sensors, or indirectly by inference from other sensors and suitable models.

Figure 2:
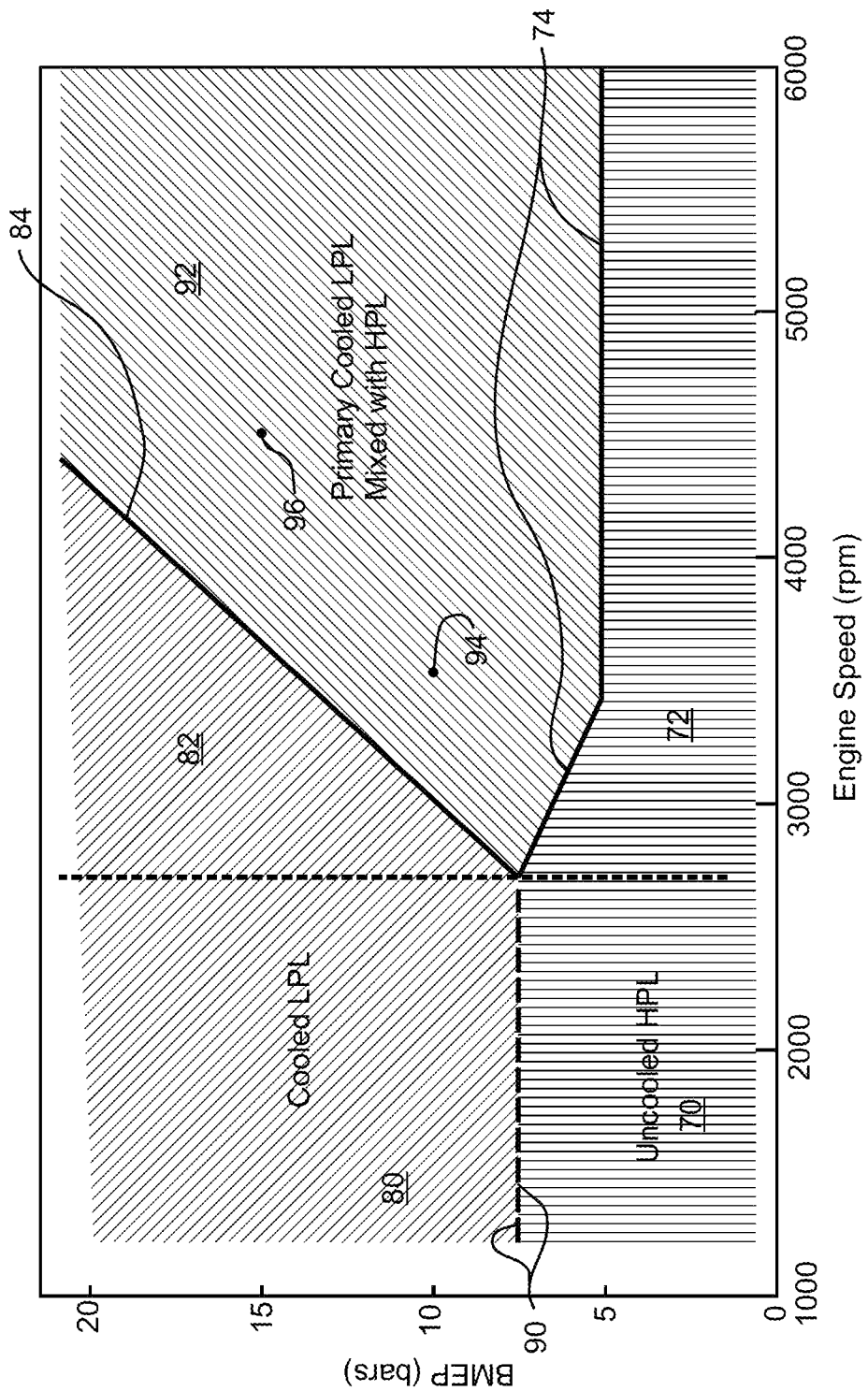
FIG. 2 is a graphical plot of Brake Mean Effective Pressure vs. Engine Speed as an illustrative model of uncooled high pressure EGR and cooled low pressure EGR according to an exemplary embodiment of knock-responsive adjustment of an external EGR mixture.

The EGR model may include an exemplary EGR map, for example, as illustrated in FIG. 2, wherein brake mean effective pressure of an engine is plotted versus speed of the engine. Although the map is two dimensional based on the aforementioned parameters, those of ordinary skill in the art will recognize that other EGR models could be used, for example, one or more look up tables, or a three dimensional map using any suitable additional parameter and the same aforementioned parameters or others.

In the example model of FIG. 2, uncooled HP EGR is used exclusively in a first operating region 70 at relatively low to intermediate loads (for example, below about 7.5 bar) over relatively low to intermediate speeds (for example, idle to about 2,750 RPM). Uncooled HP EGR is also exclusively used in a second operating region 72 including speeds and loads below an uncooled HP EGR boundary 74. In contrast, cooled LP EGR is used exclusively in a third operating region 80 including relatively intermediate to high engine loads (for example, above about 7.5 bar) over relatively low to intermediate speeds (for example, idle to about 2,750 RPM). Cooled LP EGR is also used exclusively in a fourth operating region 82 including speeds and loads between a cooled LP EGR boundary 84 and the third operating region 80. A boundary 90 divides the first and third operating regions 70, 80. And a mixture of both uncooled HP EGR and cooled LP EGR is used in a fifth operating region 92 between the uncooled HP EGR and cooled LP EGR boundaries 74, 84.

According to one exemplary implementation, an amount of uncooled HP EGR may be adjusted relative to an amount of cooled LP EGR to avoid engine knock. This adjustment may be carried out for all speeds and loads where uncooled HP EGR is both possible (for example, because of suitable pressure differential across relevant portions of the system) and preferred over cooled LP EGR (for example, for the reasons discussed above). For all such speeds and loads, if no engine knock is present, then the amount of uncooled HP EGR relative to cooled LP EGR is increased, but if engine knock is present then the amount of uncooled HP EGR is decreased until engine knock ceases. For example, and referring to FIG. 2, if no engine knock is present at 3,500 RPM and 10 bar shown at point 94, then uncooled HP EGR will be increased. However, for example, if engine knock is present at 5,000 RPM and 15 bar shown at point 96, then uncooled HP EGR will be decreased until engine knock ceases.

Finally, cooled LP EGR may be used at relatively low engine loads to reduce NOx, but uncooled HP EGR may also be used to some extent to reduce NOx at low engine loads. Also, at intermediate to relatively high engine loads, uncooled HP EGR may be used to a greater extent than LP EGR for more efficient engine operation because of lower engine pumping losses associated with HP EGR compared to LP EGR. However, because high induction gas temperatures associated with uncooled HP EGR tend to be counter productive when attempting to reduce engine knock, uncooled HP EGR may be used to a lesser extent than LP EGR under steady-state operation at relatively high engine loads associated with high temperatures.

Nonetheless, uncooled HP EGR may be used under transient operation at relatively high engine loads. This is because the uncooled HP EGR path will deliver relatively cool gases for a short but sufficient amount of time after the path is opened until the hot exhaust gases overcome thermal inertia in the path conduit, valve, manifold, and the like as the path becomes saturated with heat. Accordingly, an uncooled HP EGR path may be at least partially open or opened during such high speed, high load transients for at least some period of time. And, as the HP EGR path becomes saturated with heat, the uncooled HP EGR path may be gradually closed, for example, by gradually closing an EGR valve in the path.

The above description of embodiments is merely exemplary in nature and, thus, variations thereof are not to be regarded as a departure from the spirit and scope of the claims.

What is claimed is:

1. A method of controlling external exhaust gas recirculation being supplied into an induction system in a spark-ignition turbocharged engine, comprising:
monitoring for an engine knock in the spark-ignition turbocharged engine; and
controlling flow of an uncooled high pressure EGR and a cooled low pressure EGR to the engine, including adjustment of said uncooled high pressure EGR relative to said cooled low pressure EGR such that in response to absence of engine knock, said flow of the uncooled high pressure EGR is increased relative to said flow of the cooled low pressure EGR, and in response to presence of engine knock, said flow of the uncooled high pressure EGR is decreased relative to said flow of the cooled low pressure EGR until said engine knock ceases.

2. The method of controlling external exhaust gas recirculation according to claim 1, further comprising:
sensing speed of the spark-ignition turbocharged engine; and
determining load of the spark-ignition turbocharged engine;
wherein said controlling flow is carried out according to an exhaust gas recirculation model based on engine speed and load and including an uncooled high pressure EGR mixture region and a cooled low pressure EGR mixture region, and also wherein said adjustment is carried out when the engine operates at speeds and loads corresponding to the uncooled high pressure EGR mixture region and the cooled low pressure EGR mixture region.

3. The method of controlling external exhaust gas recirculation according to claim 1 wherein said adjustment is carried out by adjusting a position of an EGR flow control device.

4. The method of controlling external exhaust gas recirculation according to claim 3 wherein the EGR flow control device is an HP EGR valve in an uncooled HP EGR path.

5. The method of controlling external exhaust gas recirculation according to claim 1 wherein said adjustment includes allowing the uncooled HP EGR flow for at least some period of time during transient operation at relatively high engine speeds and loads.

6. The method of controlling external exhaust gas recirculation according to claim 5 wherein said adjustment includes gradually decreasing said flow of the uncooled HP EGR flow as said flow of the cooled HP EGR becomes saturated with heat.

7. The method of controlling external exhaust gas recirculation according to claim 1 further comprising sensing engine knock with at least one engine knock sensor.

8. The method of controlling external exhaust gas recirculation according to claim 1 wherein said adjustment is carried out by adjusting a position an HP EGR valve in an uncooled HP EGR path and includes allowing said flow of the uncooled HP EGR for at least some period of time during transient operation at relatively high engine speeds and loads.

9. A method of controlling external exhaust gas recirculation being supplied into an induction system in a spark-ignition turbocharged engine comprising:
sensing speed of the engine;
determining load of the engine;
monitoring for engine knock in the engine; and
controlling flow of an uncooled high pressure EGR and a cooled low pressure EGR to the engine according to an exhaust gas recirculation model that is based on engine speed and load and that includes an uncooled high pressure EGR mixture region and a cooled low pressure EGR mixture region, and including adjustment of said flow of the uncooled high pressure EGR relative to said flow of the cooled low pressure EGR when the engine operates at speeds and loads corresponding to the uncooled high pressure EGR mixture region and the cooled low pressure EGR mixture region such that in response to absence of engine knock, said flow of the uncooled high pressure EGR is increased relative to said flow of the cooled low pressure EGR, and in response to presence of engine knock, said flow of the uncooled high pressure EGR is decreased relative to said flow of the cooled low pressure EGR until said engine knock ceases.

10. The method of controlling according to claim 9 wherein said adjustment is carried out by adjusting a position of an EGR flow control device.

11. The method of controlling according to claim 10 wherein the EGR flow control device is an HP EGR valve in an uncooled HP EGR path.

12. The method of controlling according to claim 9 wherein said adjustment includes allowing said flow of the uncooled HP EGR for at least some period of time during transient operation at relatively high engine speeds and loads.

13. The method of controlling according to claim 9 wherein said adjustment includes gradually decreasing said flow of the HP EGR as said flow of he HP EGR becomes saturated with heat.

14. The method of controlling according to claim 9 further comprising sensing engine knock with at least one engine knock sensor.

15. A turbocharged spark-ignition engine system, comprising:
a turbocharger including a turbine;
an uncooled high pressure EGR path upstream of the turbocharger turbine;
a cooled low pressure EGR path downstream of he turbocharger turbine;
at least one EGR flow control device in communication with at least one of the EGR paths; and
a controller in communication with the at least one EGR flow control device to control flow of uncooled high pressure EGR to the engine and cooled low pressure EGR to the engine, wherein the controller controls the at least one EGR flow control device to adjust said flow of the uncooled high pressure EGR relative to said flow of the cooled low pressure EGR such that in absence of engine knock, said flow of the uncooled high pressure EGR is increased relative to said flow of the cooled low pressure EGR, and in presence of engine knock, said flow of the uncooled high pressure EGR is decreased relative to said flow of the cooled low pressure EGR until engine knock ceases.

16. The turbocharged spark-ignition engine system of claim 15 further comprising a cooler in the cooled LP EGR path, and no cooler in the HP EGR path.

17. The turbocharged spark-ignition engine system of claim 15 wherein the at least one EGR flow control device includes an HP EGR valve in the HP EGR path and an LP EGR valve in the LP EGR path.

* * * * *